(12) United States Patent
Hill

(10) Patent No.: US 7,181,961 B1
(45) Date of Patent: Feb. 27, 2007

(54) PRECIPITATION COLLECTING GAUGE

(76) Inventor: David E. Hill, 633 S. Hickory, Gardner, KS (US) 66030

( * ) Notice: Subject to any disclaimer, the term of this patent is extended or adjusted under 35 U.S.C. 154(b) by 51 days.

(21) Appl. No.: 10/934,925

(22) Filed: Sep. 3, 2004

(51) Int. Cl.
*A63B 53/00* (2006.01)
(52) U.S. Cl. .................................... 73/170.17
(58) Field of Classification Search ............ 73/170.17, 73/170.21, 290 R, 305
See application file for complete search history.

(56) References Cited

U.S. PATENT DOCUMENTS

| | | | |
|---|---|---|---|
| 538,989 A | 5/1895 | Wells | |
| 1,007,703 A | 11/1911 | Jobson | |
| 1,577,209 A | 3/1926 | Elliott | |
| 2,711,099 A * | 6/1955 | Hastings | 73/170.17 |
| D179,848 S | 3/1957 | Hastings | |
| 2,821,852 A | 2/1958 | Hastings | |
| 2,907,206 A * | 10/1959 | O'Neil | 73/170.17 |
| 3,535,925 A * | 10/1970 | Woofter | 73/170.17 |
| D232,859 S * | 9/1974 | Colquitt, Jr. | D10/70 |
| 5,038,606 A * | 8/1991 | Geschwender et al. | 73/170.17 |
| 5,284,052 A * | 2/1994 | Thompson | 73/170.21 |
| 5,531,114 A * | 7/1996 | Frager | 73/170.17 |
| 5,918,277 A * | 6/1999 | Yilmaz | 73/170.17 |
| D419,090 S | 1/2000 | Folos et al. | |
| 6,363,781 B1 * | 4/2002 | Moore | 73/170.17 |
| 6,609,422 B1 * | 8/2003 | Geschwender | 73/170.22 |
| 2002/0029634 A1 | 3/2002 | Jahn | |
| 2004/0261516 A1 * | 12/2004 | Simpson | 73/170.17 |

* cited by examiner

*Primary Examiner*—Max Noori
(74) *Attorney, Agent, or Firm*—Gardner Carton & Douglas LLP

(57) ABSTRACT

A precipitation gauge including a clear elongated outer cylinder and an opaque or translucent inner member disposed longitudinally in the outer cylinder to define a tubular water receiver in the space between the cylinder and the inner member and markings disposed along either the outer cylinder or the inner member, the gauge indicating the amount of water collected in the water receiver with a sharp demarcation at the top surface of the water resulting from an optical illusion making it appear that the portion of the gauge below the demarcation is filled with a fluid of the color of the inner member.

18 Claims, 3 Drawing Sheets

US 7,181,961 B1

PRECIPITATION COLLECTING GAUGE

BACKGROUND OF THE INVENTION

This invention relates to devices for collecting and measuring precipitation and, more particularly, to a precipitation gauge for collecting precipitation including rain and sprinkler-deposited water and providing a visually well-defined water level demarcation at the top surface of the water collected in the gauge and an expanded measuring scale at low precipitation levels.

Various types of devices are available for measuring precipitation. These devices typically collect the precipitation in a receptacle which has markings to indicate the level of water in the receptacle and hence the amount of precipitation collected over a period of time. Many of these prior art devices comprise containers with either a portion or the entirety of their vertical surfaces clear, so that the water within the container can be seen from a distance. Typically, level indications are applied either directly to clear areas on a container's outer surface or to areas inside the container so that the levels of precipitation collected may be read on or through the clear areas of the container.

Unfortunately, it is difficult to make out the top surface of the water collected in such precipitation collecting gauges since typically the demarcation at the top surface of the water is not a sharp, well-defined one and low amounts of precipitation produce limited measurement levels in the gauges. Thus, from a distance it is oftentimes particularly difficult to even tell whether water has been collected in the gauge and, if so, to determine the level of that water.

BRIEF SUMMARY OF THE INVENTION

One of the objects of the present invention, therefore, is to provide a precipitation-collecting gauge that produces a well-defined demarcation at the top surface of the water held in the gauge.

Another object of the invention is to provide a precipitation-collecting gauge that produces enhanced measurement levels for low amounts of precipitation but can hold and indicate larger amounts of precipitation when necessary.

A further object of this invention is to provide a precipitation gauge that can be simply manufactured and that can be readily and accurately read from a distance.

It is yet another object of the present invention to provide a precipitation collecting gauge that can be read from a distance about the entire periphery of the gauge.

These and other aspects and advantages of the invention will become apparent from the description that follows below.

The precipitation collecting gauge of the present invention thus includes a clear cylindrical elongated outer cylinder closed at its bottom and open at its top with an opaque or translucent elongated inner member disposed longitudinally in the clear cylindrical outer cylinder. A water receiver is defined in the space between the inner surface of the clear cylindrical outer cylinder and the outer surface of the inner member. A plurality of graduated markings are disposed between the bottom and the top of the clear cylindrical outer cylinder to indicate the amount of water collected in the water receiver. Finally, the inner member may be adapted to collect water above a selected level in tandem with the water receiver to thereby reduce the scale of measurement above the selected level.

DETAILED DESCRIPTION OF A PREFERRED EMBODIMENT OF THE INVENTION

Figures 1, 2:
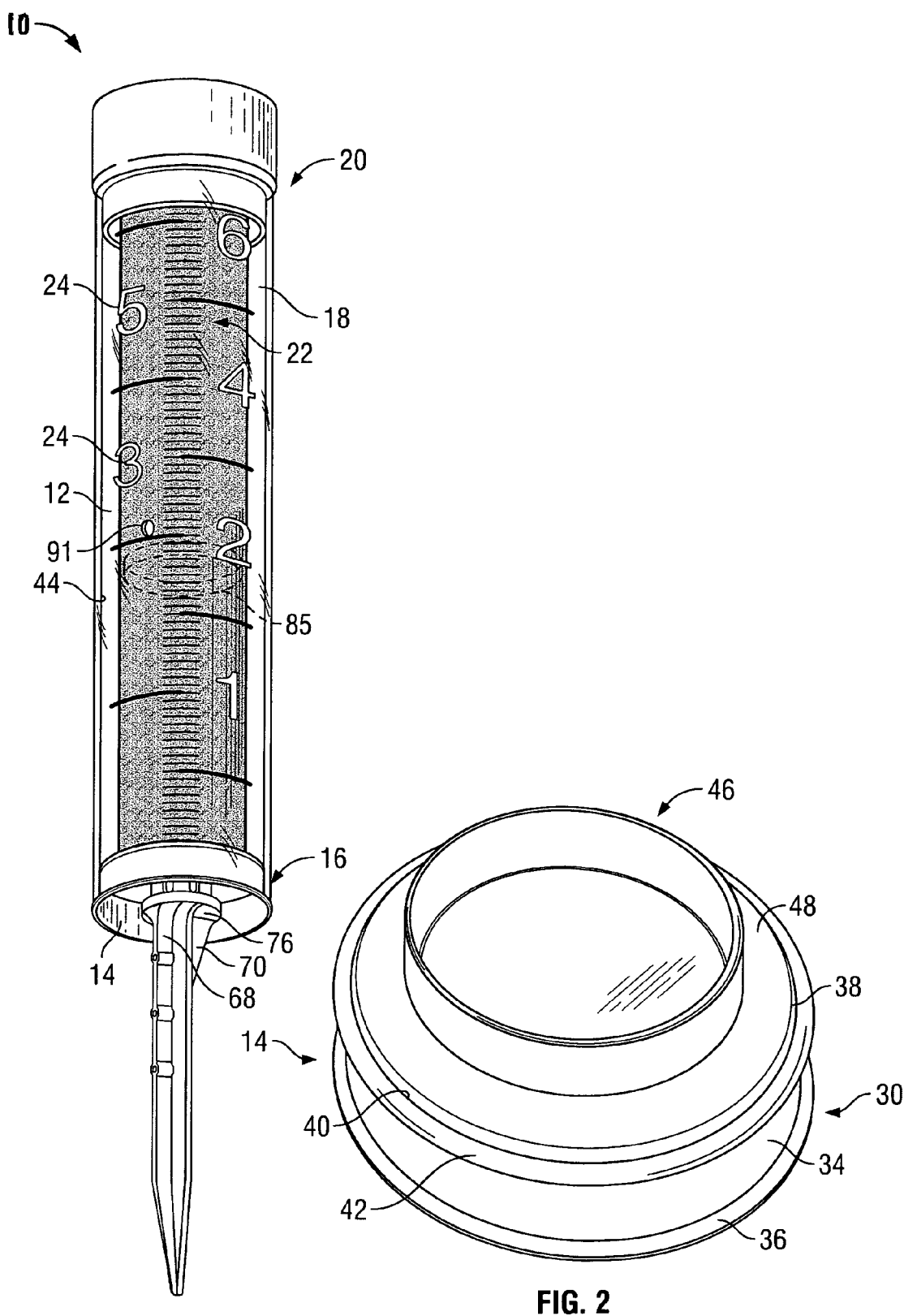
FIG. 1 is a perspective view of a fully-assembled precipitation collecting gauge in accordance with the present invention.
FIG. 2 is a perspective view of the bottom cap of the precipitation collecting gauge of FIG. 1.

Turning now to FIG. 1, a precipitation collecting gauge 10 in accordance with the present invention is shown, including an elongated outer cylinder 12 having a bottom cap 14 which is sealingly fit within the bottom 16 of the cylinder. Although less preferred, outer cylinder may be made with a polygonal rather than a circular cross-section. Bottom-capped cylinder 12 thus comprises the water receptacle 18 of the invention. Although water receptacle 18 comprises two parts in the illustrated embodiment, the water receptacle may, of course, be of a unitary or one-piece construction. For example, water receptacle 18 may be molded from a single piece of an appropriate plastic.

Outer cylinder 12 is preferably clear about its entire periphery, as shown in FIG. 1. Although outer cylinder 12 may be made of any appropriate material, it is noted that one preferred material for the cylinder is PETG (glycolised polyester).

Cylinder 16 bears water level indicators in the form of a series of generally horizontal graduated markings 22 and corresponding numbers 24 disposed between the bottom and the top of the cylinder. These markings and numbers are spaced at longitudinally appropriate distances to indicate the volume of water in the tubular water receiver 84 described below. This enables the user to read the level of water in the water receptacle, as also explained below. It is preferred that at least two and more preferably three sets of graduated markings 22 be generally evenly spaced about the periphery of the outer cylinder to make it possible to read the level of precipitation in the gauge from different directions. These scales may, for example, be aligned with points 21 in FIG. 6A.

Bottom cap 14, as best seen in FIG. 2, includes a bottom annular member 30 having an outer annular surface 34 dimensioned to fit snugly into the bottom 16 of outer cylinder 12. An outwardly protruding lip 36 is provided along the bottom edge of outer annular surface 34 to act as a stop when the bottom cap is pressed home in the bottom of the cylinder. Preferably, an appropriate adhesive or sealant is applied to the outer annular surface of the bottom cap to fix the bottom cap in the cylinder and to help seal the cylinder against leakage. Additionally, it is preferred that an upper ledge 38 be formed on the bottom cap, with an annular depression 40 for receiving an elastomeric gasket ring 42 which protrudes beyond outer annular surface 34 to sealingly engage the inner wall 44 (FIG. 1) of the cylinder to further help seal the cylinder against water leakage.

The bottom cap also includes a top ring 46 which projects upwardly from the top surface 48 of the bottom cap. This top annular member supports inner cylinder 50 (FIG. 4) which will be discussed in more detail below.

Figure 3:
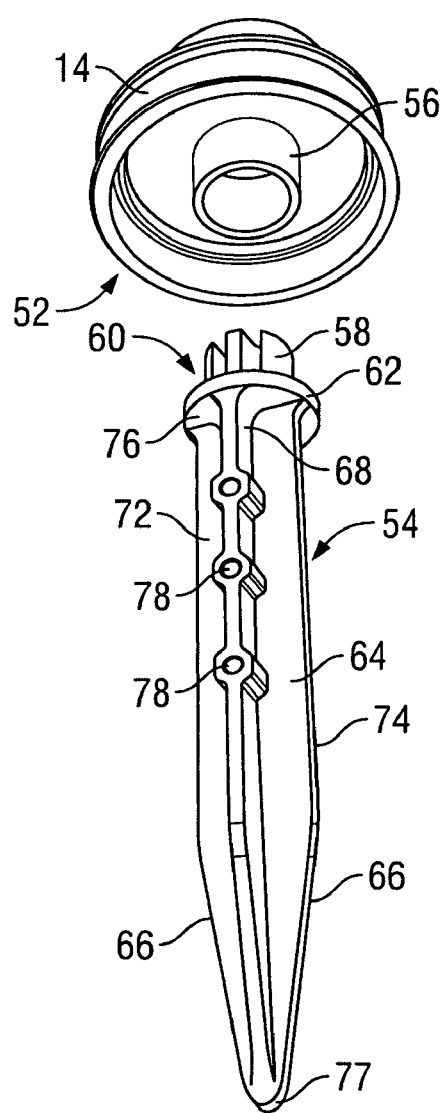
FIG. 3 is a perspective view of the stake and the bottom cap of the precipitation collecting gauge of FIG. 1.

Turning to FIG. 3, the bottom area 52 of bottom cap 14 is shown, with a stake 54 juxtaposed below the bottom area of the cap. Bottom area 52 is provided with a circular cavity 56 for receiving a male member 58 located at the top 60 of the stake. This male member preferably is held in place frictionally against the inner surface of cavity 56. The slots in male member 58 aid in cooling after the part is molded and also help control shrinkage to produce an accurate part dimension.

Moving downwardly on the stake as illustrated in FIG. 3, a ledge 62 is provided for limiting the movement of the male member 58 into cavity 56 and for helping to support the water receptacle on the stake 54. Looking downwardly from ledge 62, the stake 54 is provided with a vertical post 64 having leading angled edges 66 to facilitate insertion of the stake 54 into any soil area where it is desired to locate the precipitation gauge 10. Webs 68 and 70 (FIG. 1) project generally perpendicularly from the bottom surface 76 of ledge 62 and from the front and back faces 72 and 74 of the vertical post 64 to add rigidity to the stake 54. Web 68, which runs to the distal end 77 of post 64, is further provided with a series of nubs with holes 78 for receiving screws or nails (not shown) to attach the stake 54 to a vertical surface such as the vertical face of a fence post.

While a preferred stake configuration is described above in connection with the illustrated preferred embodiment of invention, other stake configurations could, of course, be used. Also, where water receptacle 18 is of a unitary design and no bottom cap is used, the unitary bottom of the cylinder may be provided with similar or differing means for attaching the bottom stake or the stake and the receptacle may be molded as a unitary unit.

Figure 4:
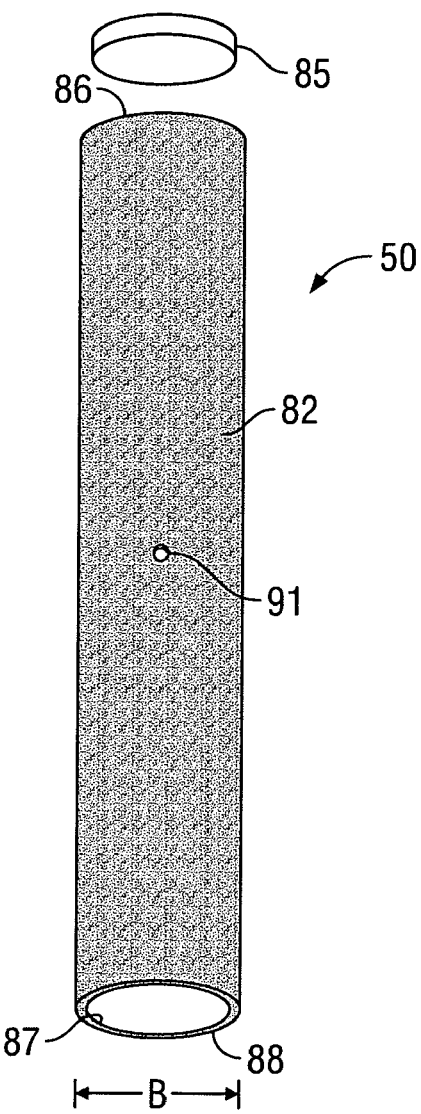
FIG. 4 is a perspective view of the colored inner cylinder of the precipitation collecting gauge of FIG. 1 with a member sized to sealingly engage the inner surface of the cylinder juxtaposed above the cylinder.
Figure 6:
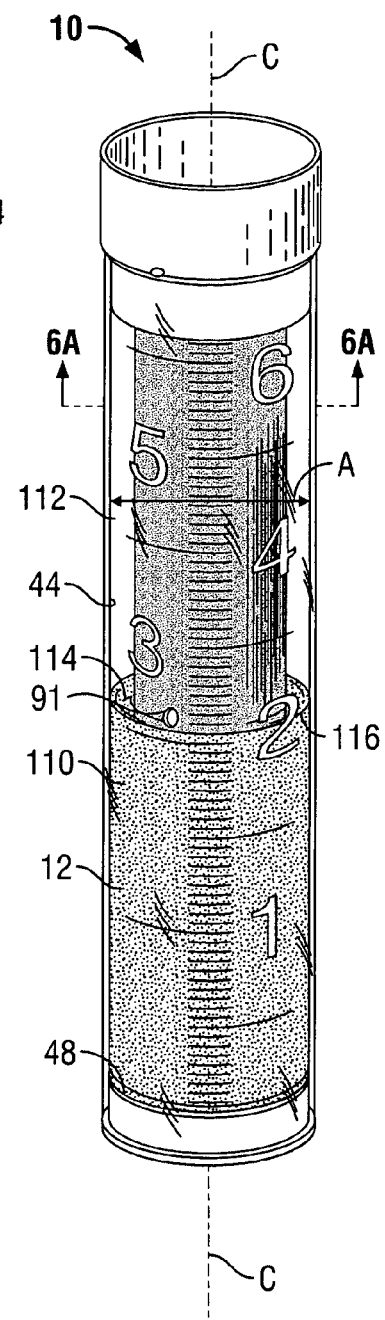
FIG. 6 is a perspective view of a partially filled precipitation collecting gauge in accordance with the present invention.
Figure 6A:
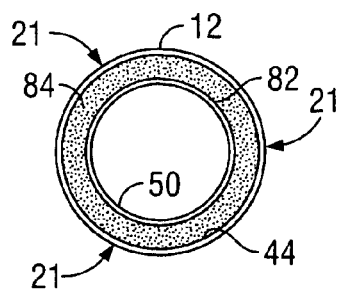
FIG. 6A is a cross-sectional view of the precipitation collecting gauge taken along line 6A—6A in FIG. 6.

FIG. 4 illustrates inner cylinder 50. (In alternate embodiments this member may be polygonal in cross-section, such as triangular, square, hexagonal, etc., as desired.) It is preferred that the inner and outer cylinders have collinear longitudinal axes, as in the illustrated embodiment. The inner cylinder has an outside diameter B (FIG. 4) less than the inside diameter A of outer cylinder 12 (FIG. 6). In the illustrated embodiment, A is about 61 mm and B is about 45 mm and the inner cylinder is preferably centered on the longitudinal axis C of outer cylinder 12, leaving an open uniform tubular water receiver 84 of about 8 mm width between the outer surface 82 of the inner cylinder and inner wall 44 of the outer cylinder extending generally from the top surface 48 of the bottom cap to the top 20 of cylinder 12.

In the illustrated embodiment the volume of water receiver 84 at any given level is about one-half of the volume of the outer cylinder at that level. As a result, the level of water collected in the water receiver will be increased by this factor (2:1 or 2 times in the illustrated embodiment) to expand the measurement scale by this factor. Other ratios or scale expansions of course can be achieved by varying the ratio of the diameters of the inner and outer cylinders. For an outer cylinder of about 2.5 inches in diameter, however, it is preferred that the width of the tubular water receiver be from at least about ⅛ inch to no more than about ½ inch.

Inner cylinder 50 is preferably hollow in construction from its top 86 to its bottom 88. A disc-shaped sealing member 85 is dimensioned and adapted to sealingly engage the inner surface 87 of the inner cylinder. In the illustrated embodiment, the open bottom end 88 of the inner cylinder sealingly engages top ring 46 of bottom cap 14. Of course, inner cylinder 50 may be of a solid construction (e.g. filled with styrofoam) and further, may be fixed within the outer cylinder by any other appropriate means. Also, the diameters of the inner and outer cylinders and hence the width of the water receiver may be chosen as desired.

It is preferred, as in the illustrated embodiment, that inner cylinder 50 be open to water entering the precipitation gauge up to the level at which sealing member 85 is positioned in the inner cylinder. This level may of course be set as desired. At least one opening, for example a drain hole 91 (or a slot, etc.) passes through the inner cylinder wall just above the plug member, as shown. This drain hole ensures that all of the precipitation captured in the rain gauge above the sealing member fills the full volume of the outer cylinder including the tubular water receiver and the corresponding volume of the inner cylinder above the sealing member. In this way, a relatively small amount of precipitation will fill a substantial vertical distance in the tubular water receiver below the sealing member, to produce a substantial and more easily read rise through the horizontal markings 22. Indeed, it is further preferred at lower volumes to maintain as small an annular width in the tubular water receiver as possible, to maximize the vertical movement of the water in the receiver until the sealing member is reached where the entire volume of the cylinder will be filled to allow a larger amount of precipitation to be gathered on a shorter measurement scale.

The central tubular member should not be clear. Rather, its surface 82 should be colored, may be translucent but preferably will be opaque. The actual color chosen for the inner cylinder will be preferably a bright intense color that will contrast with the environment in which the precipitation collecting gauge is intended to be used. In preferred embodiments, a glossy opaque yellow or orange fluorescent cylinder surface is used.

Figure 5A:
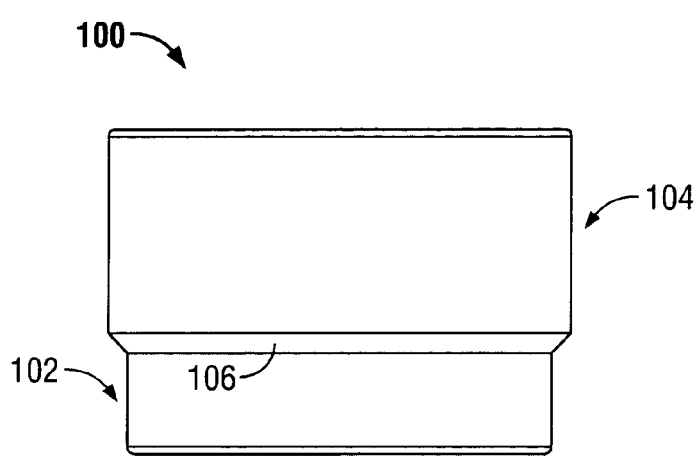
FIGS. 5A and 5B are respectively a front elevation and a top view of the water receptor of the precipitation collecting gauge of FIG. 1.
Figure 5B:
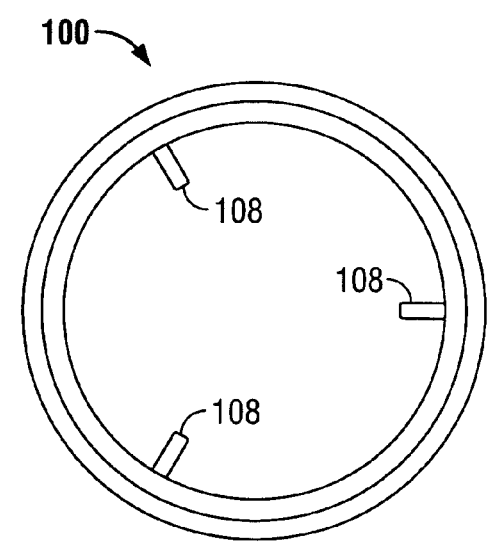

Top end 20 of outer cylinder 12 is fitted with the receptor 100 illustrated in FIGS. 5A and 5B. Receptor 100 includes a lower annular portion 102 that is dimensioned to fit snugly into the top 20 of outer cylinder 12. Receptor 100 may be fixed in place with an adhesive, by ultrasonic welding, or as otherwise desired. The outside of receptor 100 includes a top annular portion 104 which is larger in diameter than the lower annular portion 102, creating an annular ledge 106 between the annular portions 104, 102. This annular ledge 106 serves to limit the movement of the receptor 100 into the outer cylinder 12 during assembly. Receptor 100 is hollow, as best seen in FIG. 5B, and as can be appreciated from FIGS. 5A and 6, the lower annular portion 102 has an outside diameter corresponding to the inside diameter of outer cylinder 12. The receptor 100 includes annularly-directed ribs 108 which engage the outer surface of inner cylinder 50, to help maintain the central disposition of the inner cylinder 50.

Precipitation collecting gauge 10 is intended to be used generally as follows:

1. A precipitation collecting gauge 10 may be provided in the form illustrated in FIG. 1, but with stake 54 separate from bottom cap 14. If so, male member 58 of the stake is first press fit into cavity 56.

2. Once fully assembled, the precipitation collecting gauge is installed where desired by placing the stake into the ground at the desired location and then attaching the rest of the gauge to the stake as discussed above. Of course, the precipitation collecting gauge may be installed in other ways, as dictated by the environment of the desired location such as by screwing or nailing it to a fence post as described earlier.

3. Rainwater, sprinkler water, or other precipitation will be received through receptor 100 into tubular water receiver 84 to produce a level in the tubular water receiver indicative of the amount of rainwater, sprinkler water, etc. collected up to the level of 2 inches in the expanded portion of the measurement scale. FIG. 6 shows a precipitation gauge that has collected 2 inches of water.

4. If water is collected beyond the two inch level, it will fill both the inner and outer cylinders producing a level in the unexpanded portion of the measurement scale above the 2 inch level.

5. When it is desired to determine how much water has been collected, the user, from any desired distance permitting the numbers on the precipitation collecting gauge to actually be read, and from any direction from one of the three linear scales spaced about the periphery of the outer cylinder, will see the precipitation collecting gauge as depicted in FIG. 6. What is actually seen bears careful description. Thus, FIG. 6 shows a volume of water 110 in the lower portion of the tubular water receiver, with an air space 112 above. At the top surface 114 of the collected volume of water, there is a sharp demarcation 116. This demarcation is the result of an optical illusion produced by the water in the annular space, which makes it appear like the entire portion of the precipitation collecting gauge below demarcation 116 is filled with a fluid of the color of the inner cylinder, while above the demarcation the inner cylinder appears as it is, with a clear annular space surrounding it. The resulting visual effect, of a single solid colored tube below the demarcation and a solid tube of a smaller diameter sitting in a clear outer tube above the demarcation signals the presence of collected water and makes this precipitation gauge far easier to read than any currently available precipitation gauge.

Furthermore, the readability of the level of water in the gauge is further enhanced by an actual change in the intensity of the color of the inner cylinder from a first intensity of the actual color of the inner cylinder to a second intensity in the area below the demarcation where water fills the tubular water receiver. This difference in intensity further enhances the demarcation between the filled portion of the precipitation gauge and the air space above it, yet further facilitating the reading of the level of water in the precipitation collecting gauge.

If horizontal markings 22 and numbers 24 are placed on the outer surface of the inner cylinder, the water in the tubular water receiver will further produce a magnifying effect, making the markings and numbers below the demarcation larger than those above, thereby further emphasizing the location of the demarcation and hence the height of the water in the precipitation gauge.

Preferred embodiments of this invention are described herein, including the best mode known to the inventors for carrying out the invention. Variations of these preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A precipitation gauge comprising:
   a clear cylindrical elongated outer cylinder closed at its bottom and open at its top; and
   an opaque or translucent elongated inner member fixed longitudinally in the clear cylindrical elongated outer cylinder and extending longitudinally a substantially entire distance between the bottom and the top, wherein a space between an inner surface of the clear cylindrical elongated outer cylinder and an outer surface of the opaque or translucent elongated inner member defines a water receiver, and wherein
   the inner member is hollow and includes a plug at a predetermined level in the inner member, and a drain opening is configured in a wall of the opaque or translucent elongated inner member just above the plug.

2. The precipitation gauge of claim 1 including a plurality of graduated markings disposed between the bottom and the top of the clear cylindrical elongated outer cylinder to indicate an amount of water collected in the water receiver.

3. The precipitation gauge of claim 2 in which at least two series of graduated markings between the bottom and the top of the cylinder are spaced apart on the outer cylinder.

4. The precipitation gauge of claim 1 in which the outer cylinder has a polygonal cross-section.

5. The precipitation gauge of claim 1 in which the cylindrical outer cylinder is clear around its entire periphery.

6. The precipitation gauge of claim 1 including a bottom cap sealingly attached to the bottom of the clear cylindrical elongated outer cylinder.

7. The precipitation gauge of claim 1 including a stake removably attached to the precipitation gauge and extending downwardly from the bottom of the clear cylindrical elongated outer cylinder.

8. The precipitation gauge of claim 7 in which the stake includes a web extending perpendicularly from a top of the stake and at least two nubs are formed on the web to receive a screw or nail.

9. The precipitation gauge of claim 1 in which the opaque or translucent elongated inner member is cylindrical.

10. The precipitation gauge of claim 1 in which the opaque or translucent elongated inner member is centered on a longitudinal axis of the clear cylindrical elongated outer cylinder thereby defining a tubular water receiver.

11. The precipitation gauge of claim 1 in which the opaque or translucent elongated inner member has a color that contrasts with an environment in which the precipitation gauge is intended to be used.

12. The precipitation gauge of claim 1 including a plurality of vertically disposed graduated markings between the bottom and the top of the clear cylindrical outer cylinder to indicate an amount of water collected in the water receiver, in which a first vertical spacing of a first portion of the plurality of vertically disposed graduated markings configured below the plug member is expanded with respect to a second vertical spacing of a second portion of the plurality of vertically disposed graduated markings configured above the plug member.

13. The precipitation gauge of claim 12 in which the amount of water collected below the plug member per unit of height of the gauge is double the amount of water collected above the plug member.

14. A precipitation gauge comprising:
a cylindrical elongated outer cylinder clear around its entire periphery and closed at its bottom and open at its top;
an opaque or translucent cylindrical elongated inner member fixed longitudinally in the clear cylindrical elongated outer cylinder and extending longitudinally a substantially entire distance between the bottom and the top, wherein a space between an inner surface of the clear cylindrical elongated outer cylinder and an outer surface of the opaque or translucent elongated inner member defines a water receiver;
a plurality of graduated markings disposed between the bottom and the top of the clear cylindrical outer cylinder to indicate an amount of water collected in the water receiver; and
a stake removably attached to the bottom of the cylindrical elongated outer cylinder, and wherein the opaque or translucent cylindrical elongated inner member is hollow and includes a plug member at a predetermined level in the inner member, and a drain opening is configured in a wall of the opaque or translucent elongated inner member just above the plug.

15. The precipitation gauge of claim 14 in which the opaque or translucent cylindrical elongated inner member is coaxial with the cylindrical elongated outer cylinder thereby defining a water receiver including a longitudinally-extending annular portion.

16. The precipitation gauge of claim 14 wherein the plurality of graduated markings comprise a first vertical spacing below the plug member and a second vertical spacing above the plug member, the first vertical spacing being expanded with respect to the second vertical spacing.

17. The precipitation gauge of claim 16 in which the amount of water collected below the plug member per unit of height of the gauge is double the amount of water collected above the plug member.

18. The precipitation gauge of claim 14 in which the opaque or translucent elongated cylindrical inner member has a color that contrasts with an environment in which the precipitation gauge is intended to be used.

* * * * *